United States Patent [19]

Black

[11] Patent Number: 5,353,509

[45] Date of Patent: Oct. 11, 1994

[54] MULTI-PURPOSE T-SQUARE AND LEVEL COMBINATION TOOL

[76] Inventor: Daniel C. Black, 829 Belgrade Ave., Atlanta, Ga. 30067

[21] Appl. No.: 97,553

[22] Filed: Jul. 27, 1993

[51] Int. Cl.⁵ ............................ B43L 7/02; G01C 9/26
[52] U.S. Cl. ........................................ 33/451; 33/376; 33/476; 33/478; 33/479
[58] Field of Search ................. 33/429, 474, 476, 478, 33/479, 480, 481, 451, 374, 375, 376, 464

[56] References Cited

U.S. PATENT DOCUMENTS

| | | | |
|---|---|---|---|
| 255,778 | 4/1882 | Fisher | 33/375 |
| 383,375 | 5/1888 | Short | 33/451 |
| 685,369 | 10/1901 | Barrie | 33/479 |
| 1,182,730 | 5/1916 | Anderson et al. | 33/376 |
| 1,298,010 | 3/1919 | Coleman | 33/451 |
| 1,982,178 | 11/1934 | Rudolff | 33/451 |
| 2,728,989 | 1/1956 | Laggran | 33/451 |
| 2,761,215 | 9/1956 | Macklanburg | 33/480 |
| 4,910,876 | 3/1990 | Channell | 33/376 |
| 4,955,141 | 9/1990 | Welch | 33/451 |
| 5,245,758 | 9/1993 | Riley | 33/478 |

FOREIGN PATENT DOCUMENTS

| | | | |
|---|---|---|---|
| 321863 | 2/1919 | Fed. Rep. of Germany | 33/479 |
| 308201 | 9/1955 | Switzerland | 33/451 |

Primary Examiner—Thomas B. Will
Attorney, Agent, or Firm—Harry I. Leon; Vivian L. Steadman

[57] ABSTRACT

A multi-purpose combination tool for forming an enlarged T-square or, alternately, an elongated carpenter's level to facilitate installation of wall panels, doors, windows, signs and the like. The tool comprises an arm and a cross member rigidly mountable perpendicularly thereon. The arm and the cross member each have a central web portion with parallel flanges at opposite end edges of the web portion and spaced apart level vials secured within cutouts formed in each of the respective web portions. Ruler scales are situated along the end edges so that when the arm is rigidly mounted perpendicularly to the cross member, the scales share a common point of origin. In addition, the cross member, when so attached to the arm, forms a shoulder projecting outwardly therefrom against which the straight edge of a workpiece can be abutted while the arm itself is used as a guide for marking or cutting. Extension of either the arm or the cross member or both is possible by attaching additional pieces similar to the arm to each of them. To make simply an elongated carpenter's level, the cross member can be attached to the arm so that the cross member forms a longitudinal extension thereof. Conversion of the tool from an enlarged T-square to arm elongated carpenter's level and vice versa is readily accomplished as is disassembly for transport.

5 Claims, 3 Drawing Sheets

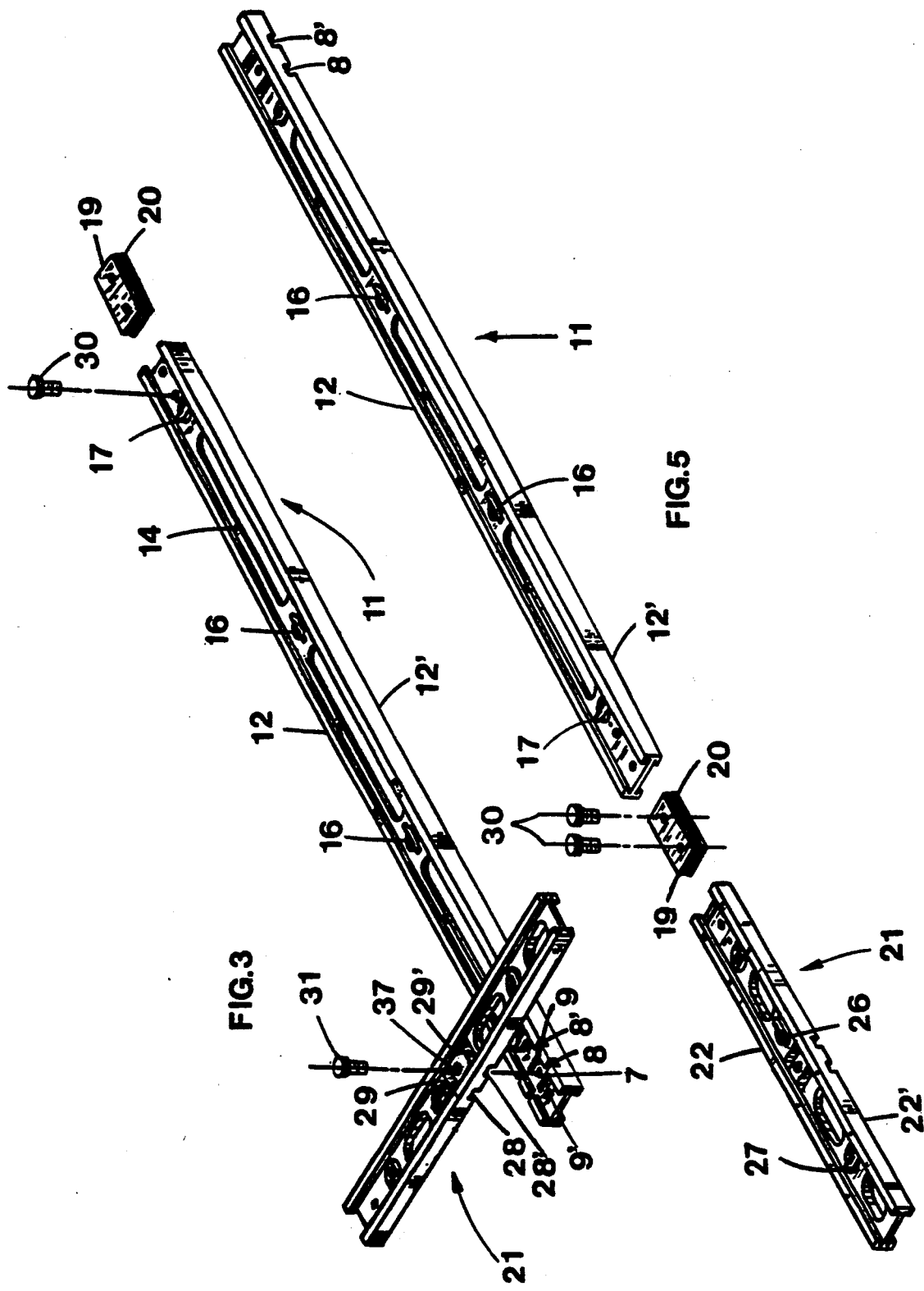

MULTI-PURPOSE T-SQUARE AND LEVEL COMBINATION TOOL

BACKGROUND OF THE INVENTION

Tools having a square and level in combination are known in the prior art. In U.S. Pat. No. 4,910,876, issued on Mar. 27, 1990, Charmell teaches the use of an arm which can be slideably attached to an ordinary carpenter's level to form a square. Another version of a level with an arm slideably mounted thereon is disclosed by McSorley, in U.S. Pat. No. 4,607,437, issued on Aug. 26, 1986.

Moreover, the benefits of having an extensible level have been widely recognized in the prior art. In U.S. Pat. No. 4,928,395 issued on May 29, 1990, Good discloses such a level having two extenders slideably attached to a center section. Other slideably extensible levels are disclosed by Youmarts, U.S. Pat. No. 4,733,475, issued on Mar. 29 1988; Gould, U.S. Pat. No. 4,503,623, issued Mar. 12, 1985; and Drumright, U.S. Pat. No. 4,862,595, issued Sep. 5, 1989.

Nevertheless, the only prior art device which can readily be converted from an elongated carpenter's rule to a square and vice versa is a foldable level disclosed in U.S. Pat. No. 4,327,501, issued in 1982. There Hurt teaches a tool having an arm which can be pivotted into a position in which the arm projects at 90 degrees relative to the longitudinal centerline of the level.

In the prior art, the installation of dry wall or plywood panel required the use of three instruments: a square, a ruler and a level to determine the proper size and location of plumbing and electrical outlets. Before installing wall panel, for example, a carpenter would need to establish the location of a particular outlet with respect to some fixed point on the panel by measuring certain horizontal and vertical distances accurately. The present method of establishing such a location includes juggling, often in combination, a level, a ruler and a square it, order to make these measurements. Simultaneously juggling these same three instruments has also been a routine part of window and door installation.

SUMMARY OF THE INVENTION

The object of this invention is to provide a combination tool which will not only eliminate the need to juggle a level, a measure, and a square while installing wall panels, doors, windows, signs and the like, but also can be converted to be used simply as a carpenter's level in one of three or more different lengths.

A further object of this invention is to provide such a combination tool to facilitate faster and more accurate measurement than would otherwise be possible using separate tools as in the prior art.

A further object of this invention is to provide a tool with which one can readily read levels and scales oriented in both the horizontal and vertical directions virtually simultaneously.

A further object of this invention is to provide an elongated straight edge that can be used for marking and as a guide for cutting a whole workpiece, such as full length wall panels, at one time without resetting the straight edge during either the marking or the cutting processes.

A still further object of this invention is to provide a T-square or, alternately, a level made in sections which can be joined as required to fit the requirements of a job.

A still further object of this invention is to provide a T-square having an elongated arm which is sufficiently rugged to be used as a cutting edge with either a razor blade or a circular saw, as appropriate, for the workpiece at hand.

In accordance with the present invention, there is provided a combination tool which comprises an elongated arm and elongated cross member, both of which are inscribed with measuring indicia and equipped with level vials variously aligned parallel with and perpendicular to the longitudinal centerline of the element on which they are mounted. The tool further comprises means for removably attaching the arm and cross member together in such a way that their longitudinal centerlines are disposed perpendicular to or, alternately, aligned parallel with each other. Moreover, the arm and the cross member can be joined at several locations without the use of tools; and either or both the arm and the cross member can be extended, to accomodate large workpieces, by adding one or more sections to each. For ease in transport, the tool can be easily disassembled and packaged in a small case.

BRIEF DESCRIPTION OF THE DRAWINGS

FIG. 3 is an exploded perspective view of the multi-purpose tool according to the present invention;

FIG. 4 is perspective view of the multi-purpose tool according to the present invention, the tool being shown assembled in a configuration in which the cross member is joined to the arm to form an extension thereof;

FIG. 5 is exploded perspective view, on a reduced scale, of the multi-purpose tool according to FIG. 4; and FIG. 6 is a cross section taken along line 6—6 of FIG. 4.

DETAILED DESCRIPTION OF THE PREFERRED EMBODIMENT

Figure 1:
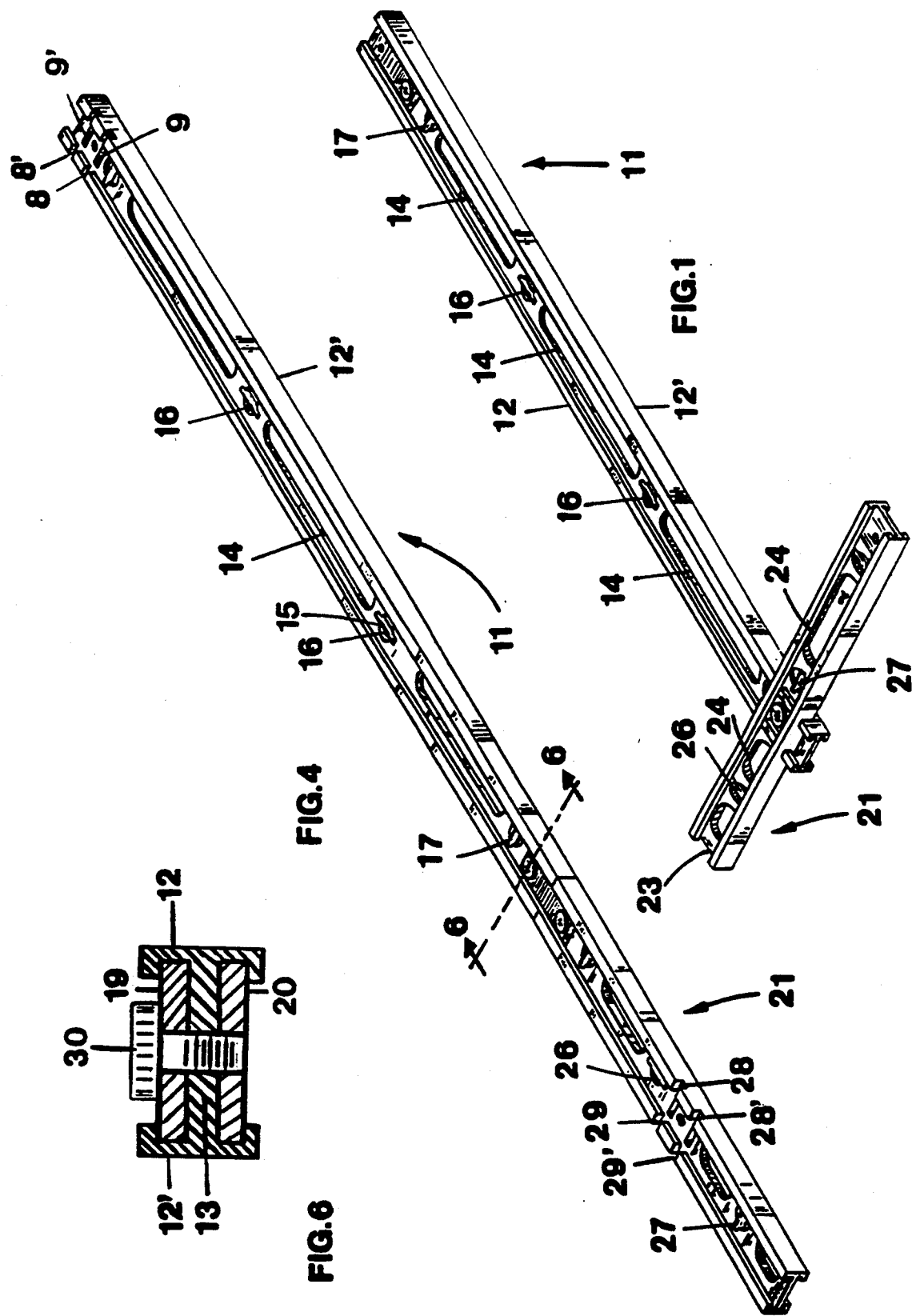
FIG. 1 is perspective view of the multi-purpose tool according to the present invention, the tool being shown assembled in its T-square configuration.

Referring now to the drawing, a combination tool, indicated generally by the reference numeral 10, comprises an arm 11 and a cross member 21, both of which are fabricated from either extruded or molded metal or plastic.

In transverse cross-section, both the arm 11 and the cross member 21 are shaped generally like an 1-beam. In particular, the arm 11 has parallel flanges 12, 12' interconnected by a central web 13. The web 13 defines holes 14, 15, 15'. The holes 14 lighten the weight of the arm 11 and also facilitate a user's gripping the tool 10 firmly. In the holes 15, 15', on the other hand, level vials 16, 17 are disposed, respectively, parallel to and perpendicular to the longitudinal axis of the arm 11. Similarly to the arm 11, the cross member 21 has flanges 22, 22', a central web portion 23, weight reduction holes 24 and holes 25, 25' in which level vials 26, 27 are disposed, respectively, parallel to and perpendicular to the longitudinal centerline of the cross member 21.

Figure 2:
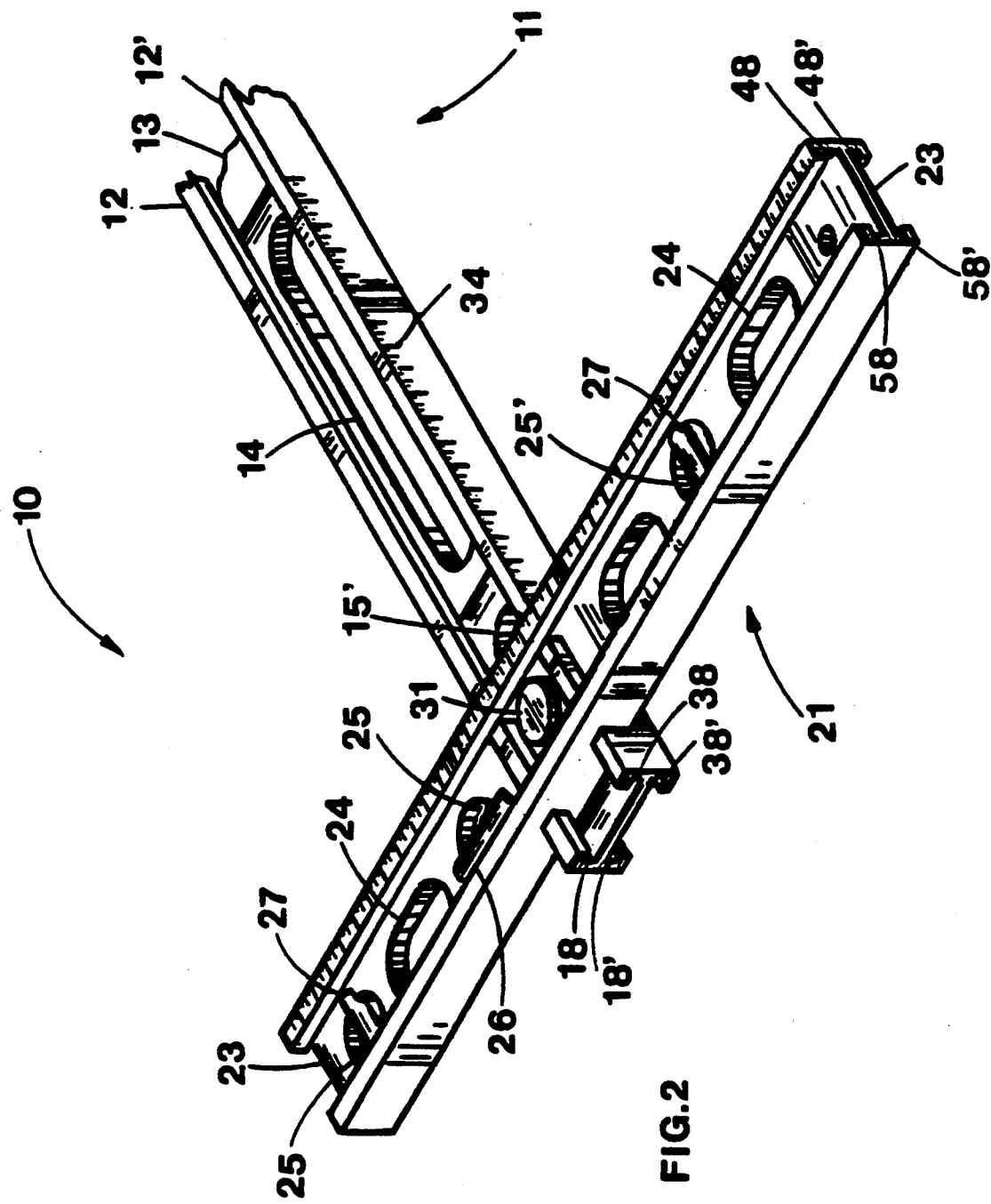
FIG. 2 is a perspective view, on an enlarged scale, of a fragmentary section of the multi-purpose tool according to FIG. 1.

As illustrated in FIGS. 2, 4, 5 and 6, means for joining the arm 11 and cross member 21 includes a pair of fastener plates 19. 20 and walls of each of the flanges 12, 12', 22, 22' defining a pair of parallel, inwardly facing grooves 18, 18'; 38, 38'; 58, 58'; 48, 48', respectively. In the arm 11, paired grooves 18 and 18'; 38 and 38' are disposed on each side of the central web portion 13; likewise in the cross member 21 paired grooves 28 and 28'; 48 and 48' are juxtaposed, being separated only by the central web portion 23. When the cross member 21 is used as an extension of the arm 11, the fastener plates 19, 20 are slideably engaged with the arm 11 and with the cross member 21, distal end portions of the plates being disposed within pairs of grooves 18, 38; , 58, 48; and 18', 38'; 58', 48', respectively, that face each other in the arm and in the cross member, respectively. In addition, each of the fastener plates 19, 20 has at least two holes formed therein, with the holes in each plate being alignable with holes in the other plate and with holes formed in the arm 11 and in the cross member 21, respectively. At least two fasteners such as bolts 30, each of which can be inserted into the holes in the plates 19, 20 in the arm 11 and in the cross member 21 are employed to hold the arm 11 and the cross member 21 together in assembled relation.

In the embodiment illustrated in the drawing, means for joining the arm 11 and the cross member 21 together to form a T-square comprises each of the flanges 12, 12' having paired, parallel grooves 8, 8', the spacing between each pair of grooves being the same as the minimum distance between the flanges 22, 22' of the cross member 21 and each of the grooves 8, 8' being approximately the same depth. In addition, the pairs of grooves 8 and 8' are aligned with each other, so that the cross member 21 can be fitted into the pairs of grooves 8 and 8'. Further, the central web portion 13 of the arm 11 defines a pair of elongated, transverse slots 9, 9' disposed parallel to each other and spaced apart by the same minimum distance as are the paired, parallel grooves 8, 8'. Similarly, in the cross member 21, each of the flanges 22, 22' has paired, parallel grooves 28, 28', the grooves in each of these pairs being spaced apart from each other by the minimum distance between the flanges 12, 12' of the arm 11 and each of the grooves 8, 8' having approximately the same depth. In addition, the pairs of grooves 8 and 8' are aligned with each other, so that the arm 11 can be fitted into the pairs of grooves 28 and 28'. Further, the central web portion 23 of the cross member 21 defines a pair of elongated, transverse slots 29, 29' disposed parallel to each other and spaced apart by the same minimum distance as are the paired, parallel grooves 28, 28'. Both the arm 11 and the cross member 21 have at least one hole 7, 37, respectively, formed therein, with the respective hole being disposed between the proximate pair of slots 9, 9'; 29, 29' and with the holes 7, 37 being alignable with each other. At least one fastener such as a bolt 31 insertable into the holes 7, 37 is employed to hold the arm 11 and the cross member 21 together in assembled relation.

In the preferred embodiment, the arm 11 and the cross member 21, when joined to the arm 11 to form a T-square, define a shoulder which projects outwardly a distance which measures, by way of example, about $\frac{3}{8}$ inch from proximate edges of the arm. With the tool 10 in its T-square configuration, a person can catch an edge of a workpiece such as wall board or the like against the shoulder, so as to facilitate marking and cutting the workpiece.

At least one longitudinally-extending edge of the arm 11 is preferably inscribed with measuring indicia 34 starting with zero in each case at the intersection of the arm with the cross member 21. Likewise, at least one longitudinally-extending edge of the cross member 21 are preferably inscribed with measuring indicia having said intersection as their respective origin.

It is understood that those skilled in the art may conceive other applications, modifications and/or changes in the invention described above. Any such applications, modifications or changes which fall within the purview of the description are intended to be illustrative and not intended to be limitative. The scope of the invention is limited only by the scope of the claims appended hereto.

I claim:
1. A multi-purpose tool for simultaneously measuring a workpiece along two directions which are oriented perpendicularly to each other, comprising:
   (a) an elongated arm, the arm having first and second longitudinally extending flanges disposed parallel to each other and a first central web portion interconnecting the first and second flanges, the first and second flanges defining first and second inwardly facing grooves, respectively, which face each other on opposite sides of the first central web portion;
   (b) at least one level vial fixedly attached to the arm;
   (c) a cross member, the cross member having third and fourth longitudinally extending flanges disposed parallel to each other and a second central web portion interconnecting the third and fourth flanges, the third and fourth flanges defining third and fourth inwardly facing grooves, respectively, which face each other on opposite sides of the second central web portion;
   (d) at least one level vial fixedly attached to the cross member;
   (e) means for removably attaching the arm and the cross member in such a way that their longitudinal centerlines are disposed perpendicular to each other, the arm and the cross member defining a shoulder which projects outwardly a substantial distance form the arm when the arm and the cross member are attached with their longitudinal centerlines disposed perpendicular to each other; and
   (f) means for removably joining the arm and the cross member in such a way that their longitudinal centerlines are disposed parallel with each other, the cross member forming an extension of the arm when the arm and the cross member are joined with their longitudinal centerlines disposed parallel with each other, the joining means being slideably engageable with the arm and with the cross member when the arm and the cross member have their respective first and third grooves and their respective second and fourth grooves, respectively, disposed in parallel alignment with each other.

2. A multi-purpose tool according to claim 1 wherein the arm and the cross member each have at least one longitudinally-extending edge along which is disposed a measurement scale.

3. A multi-purpose tool, comprising:
   (a) an arm having first and second longitudinally extending flanges disposed parallel to each other and a first central web portion interconnecting the first and second flanges;

(b) a cross member having third and fourth longitudinal flanges disposed parallel to each other and a second central web portion interconnecting the third and fourth flanges; and (c) means for removably attaching the arm and cross member together to form a T-square including the first and second flanges having first and second pairs of parallel grooves disposed transversely tot he longitudinal centerline of the arm, spacing between the first and second pairs being approximately equal to spacing between the third and fourth flanges, the first and second flanges having each of the grooves in the first and second pairs, respectively, being of approximately the same depth, the first and second flanges having the parallel grooves of the fist and second pairs aligned with each other, so that the cross member can be fitted into said first and second pairs of parallel grooves; the first central web portion defining a pair of elongated, transverse slots disposed parallel to each other, spacing between the slots in the first central web portion being approximately equal to spacing between the third and fourth flanges; the third and fourth flanges having third and fourth pairs of parallel grooves, spacing between the third and fourth pairs being approximately equal to spacing between the first and second flanges, the third and fourth flanges having each of the grooves in the third and fourth pairs, respectively, being of approximately the same depth, the third and fourth flanges having the parallel grooves of the third and fourth pairs aligned with each other, so that the arm can be fitted into the grooves of the third and fourth paris; the second central web portion defining a pair of elongated, transverse slots disposed parallel to each other, spacing between the slots in the second central web portion being approximately equal to spacing between the first and second flanges.

4. A multi-purpose tool according to claim 3 wherein the arm has secured thereto at least two first level vials, one of the first level vials being aligned parallel with and the other first level vial being disposed perpendicular to the longitudinal centerline of the arm; and the cross member has secured thereto at least two second level vials, one of the second level vials being aligned parallel with and the other second level vial being disposed perpendicular to the longitudinal centerline of the cross member.

5. A multi-purpose tool, comprising:

(a) an arm having first and second longitudinally extending flanges disposed parallel to each other and a first central web portion interconnecting the first and second flanges;

(b) a cross member having third and fourth longitudinal flanges disposed parallel to each other and a second central web portion interconnecting the third and fourth flanges; and (c) means for removably attaching the arm and cross member together to form a T-square including the first and second flanges having first and second pairs of parallel grooves disposed transversely to the longitudinal centerline of the arm, spacing between the first and second pairs being approximately equal to spacing between the third and fourth flanges, the first and second flanges having each of the grooves in the first and second pairs, respectively, being of approximately the same depth, the first and second flanges having the parallel grooves of the first and second pairs aligned with each other, so that the cross member can be fitted into said first and second pairs of parallel grooves; the third and fourth flanges having third and fourth pairs of parallel grooves, spacing between the third and fourth pairs being approximately equal to spacing between the first and second flanges, the third and fourth flanges having each of the grooves in the third and fourth pairs, respectively, being of approximately the same depth, the third and fourth flanges having the parallel grooves of the third and fourth pairs aligned with each other, so that the arm can be fitted into the grooves of the third and fourth pairs.

* * * * *